(12) United States Patent
Du et al.

(10) Patent No.: US 11,949,093 B2
(45) Date of Patent: Apr. 2, 2024

(54) POSITIVE ACTIVE MATERIAL, POSITIVE ELECTRODE PLATE, ELECTROCHEMICAL ENERGY STORAGE APPARATUS, AND APPARATUS

(71) Applicant: CONTEMPORARY AMPEREX TECHNOLOGY CO., LIMITED, Ningde (CN)

(72) Inventors: Rui Du, Ningde (CN); Na Liu, Ningde (CN); Yongchao Liu, Ningde (CN); Sihui Wang, Ningde (CN); Deyu Zhao, Ningde (CN); Xue Leng, Ningde (CN)

(73) Assignee: CONTEMPORARY AMPEREX TECHNOLOGY CO., LTD., Ningde (CN)

( * ) Notice: Subject to any disclaimer, the term of this patent is extended or adjusted under 35 U.S.C. 154(b) by 622 days.

(21) Appl. No.: 17/132,567

(22) Filed: Dec. 23, 2020

(65) Prior Publication Data
US 2021/0126245 A1 Apr. 29, 2021

Related U.S. Application Data

(63) Continuation of application No. PCT/CN2019/129365, filed on Dec. 27, 2019.

(30) Foreign Application Priority Data

Dec. 29, 2018 (CN) .......................... 201811646958.2

(51) Int. Cl.
*H01M 4/134* (2010.01)
*H01M 4/02* (2006.01)
(Continued)

(52) U.S. Cl.
CPC ........... *H01M 4/134* (2013.01); *H01M 4/131* (2013.01); *H01M 4/366* (2013.01); *H01M 4/505* (2013.01);
(Continued)

(58) Field of Classification Search
CPC ...... H01M 4/134; H01M 4/131; H01M 4/366; H01M 4/505; H01M 4/525;
(Continued)

(56) References Cited

U.S. PATENT DOCUMENTS 7,727,673 B2  6/2010 Ooyama et al.
2007/0224506 A1  9/2007 Ooyama et al.
(Continued)

FOREIGN PATENT DOCUMENTS

CN  101369658 A  2/2009
CN  105226271 A  1/2016
(Continued)

OTHER PUBLICATIONS

Contemporary Amperex Technology Co., Limited, Extended European Search Report, EP19904411.6, dated Sep. 3, 2021, 8 pgs.
(Continued)

*Primary Examiner* — Daniel S Gatewood
(74) *Attorney, Agent, or Firm* — Kilpatrick Townsend & Stockton LLP

(57) ABSTRACT

This application provides a positive active material, a positive electrode plate, an electrochemical energy storage apparatus, and an apparatus. The positive active material is $Li_xNi_yCo_zM_kMe_pO_rA_m$ or $Li_xNi_yCo_zM_kMe_pO_rA_m$ whose surface is provided with a coating layer. The positive active material is secondary particles, and a particle size $D_n10$ of the positive active material satisfies: $0.5\ \mu m \leq D_n10 \leq 3\ \mu m$. In this application, particle morphology of the positive active material and the amount of micro powder in the positive active material are properly controlled, to effectively reduce side reactions between the positive active material and an electrolyte, decrease gas production of the electrochemical energy storage apparatus, and improve storage performance of the electrochemical energy storage apparatus without (Continued)

Particle size (μm)

deteriorating energy density, cycle performance and rate performance of the electrochemical energy storage apparatus.

17 Claims, 4 Drawing Sheets

(51) Int. Cl.
  *H01M 4/131* (2010.01)
  *H01M 4/36* (2006.01)
  *H01M 4/505* (2010.01)
  *H01M 4/525* (2010.01)
  *H01M 10/0525* (2010.01)

(52) U.S. Cl.
  CPC ....... *H01M 4/525* (2013.01); *H01M 10/0525* (2013.01); *H01M 2004/021* (2013.01); *H01M 2004/028* (2013.01); *H01M 2220/20* (2013.01)

(58) Field of Classification Search
  CPC ....... H01M 10/0525; H01M 2004/021; H01M 2004/028; H01M 2220/20; H01M 4/62; H01M 4/628; H01M 4/362; C01P 2002/52; C01P 2002/54; C01P 2004/51; C01P 2004/60; C01P 2004/61; C01P 2006/12; C01P 2006/40; C01G 53/50; Y02E 60/10

See application file for complete search history.

(56) References Cited

U.S. PATENT DOCUMENTS

| 2012/0104311 | A1  | 5/2012 | LeVasseur et al. |
| 2017/0155139 | A1* | 6/2017 | Feng ............ H01M 4/525 |
| 2020/0203706 | A1* | 6/2020 | Holman ......... H01M 4/0471 |

FOREIGN PATENT DOCUMENTS

| CN | 105449196 A | 3/2016 |
| CN | 105958062 A | 9/2016 |
| CN | 106716689 A | 5/2017 |
| CN | 107565125 A | 1/2018 |
| CN | 108206278 A | 6/2018 |
| CN | 110233247 A | 9/2019 |
| EP | 1391950 B1  | 8/2010 |
| EP | 3168908 A1  | 5/2017 |

OTHER PUBLICATIONS

Contemporary Amperex Technology Co., Limited, International Search Report and Written Opinion, PCT/CN2019/129365, dated Mar. 26, 2020, 14 pgs.

Ningder Age New Energy Technology Co., Ltd., First Office Action, CN201811646958.2, dated May 26, 2020, 13 pgs.

Ningder Age New Energy Technology Co., Ltd., First Office Action, CN202011285734.0, dated Jul. 19, 2021, 13 pgs.

* cited by examiner

POSITIVE ACTIVE MATERIAL, POSITIVE ELECTRODE PLATE, ELECTROCHEMICAL ENERGY STORAGE APPARATUS, AND APPARATUS

CROSS-REFERENCE TO RELATED APPLICATIONS

This application is a continuation application of PCT Patent Application No. PCT/CN2019/129365, entitled "POSITIVE ELECTRODE ACTIVE MATERIAL, POSITIVE ELECTRODE PLATE, ELECTROCHEMICAL ENERGY STORAGE APPARATUS, AND APPARATUS" filed on Dec. 27, 2019, which claims priority to Chinese Patent Application No. 201811646958.2, filed with the State Intellectual Property Office of the People's Republic of China on Dec. 29, 2018, entitled "POSITIVE ACTIVE MATERIAL, POSITIVE ELECTRODE PLATE, ELECTROCHEMICAL ENERGY STORAGE APPARATUS", all of which are incorporated herein by reference in their entirety.

TECHNICAL FIELD

This application relates to the field of electrochemical technologies, and in particular, to a positive active material, a positive electrode plate, an electrochemical energy storage apparatus, and an apparatus.

BACKGROUND

With the continuous escalation of energy crises and environmental problems, developing new green energy has become urgent. Lithium-ion batteries have been widely used in various fields due to their advantages such as high specific energy, use in a wide range of temperatures, low self-discharge rate, long cycle life, good safety performance, and no pollution. In addition, the replacement of conventional diesel vehicles with new energy vehicles using lithium-ion batteries as energy systems has also been gradually tried all over the world. At present, however, commonly used positive active materials such as lithium iron phosphate (LiFePO$_4$) and low-nickel ternary materials (LiNi$_{1/3}$Co$_{1/3}$Mn$_{1/3}$O$_2$) cannot fully meet requirements of lithium-ion batteries for energy density due to inherent limitations of the materials. Energy density of lithium-ion batteries can be improved by increasing nickel content of the ternary material. Therefore, high-nickel ternary materials are currently one of main research subjects of positive active materials for lithium-ion batteries. However, with the increase of the nickel content, side reactions between the ternary material and an electrolyte also increase significantly, which causes severe gas production in the lithium-ion batteries. This is currently one of biggest bottlenecks in commercial mass production of high-nickel ternary materials.

Currently, at a material level, methods for alleviating the gassing problem of lithium-ion batteries mainly include reducing nickel content in the ternary material and washing to reduce residual lithium content on a surface of the positive active material. However, these methods all cause different degrees of damage to performance of the lithium-ion batteries, for example, reduced reversible capacity per gram of the lithium-ion batteries, and deteriorated cycle performance.

Therefore, effective technical methods are needed to allow lithium-ion batteries to have higher energy density to meet increasingly stringent application requirements, while decreasing gas production of the lithium-ion batteries and improving storage performance of the lithium-ion batteries.

SUMMARY

In view of the problems existing in the background, an objective of this application is to provide a positive active material, a positive electrode plate, an electrochemical energy storage apparatus, and an apparatus. This application can effectively reduce side reactions between the positive active material and an electrolyte, decrease gas production of the electrochemical energy storage apparatus, and improve storage performance of the electrochemical energy storage apparatus without deteriorating energy density, cycle performance and rate performance of the electrochemical energy storage apparatus.

To achieve the foregoing objective, one aspect of this application provides a positive active material. The positive active material is Li$_x$Ni$_y$Co$_z$M$_k$Me$_p$O$_r$A$_m$ or Li$_x$Ni$_y$Co$_z$M$_k$Me$_p$O$_r$A$_m$ whose surface is provided with a coating layer, where 0.85≤x≤1.15, 0<y<1, 0<z<1, 0<k<1, 0≤p≤0.1, 1≤r≤2, 0≤m≤1, m+r≤2, M is one or two selected from Mn and Al, Me is one or more selected from Zr, Zn, Cu, Cr, Mg, Fe, V, Ti, Sr, Sb, Y, W, and Nb, and A is one or more selected from N, F, S, and Cl. The positive active material is secondary particles, and a particle size D$_n$10 of the positive active material satisfies: 0.5 μm≤D$_n$10≤3 μm.

According to another aspect of this application, this application provides a positive electrode plate, where the positive electrode plate includes the positive active material in the one aspect of this application.

According to still another aspect of this application, this application provides an electrochemical energy storage apparatus, where the electrochemical energy storage apparatus includes the aforementioned positive active material.

According to yet another aspect of this application, this application provides an apparatus, where the apparatus is a vehicle and includes the aforementioned electrochemical energy storage apparatus.

The beneficial effects of this application include the following:

In this application, particle morphology of the positive active material and the amount of micro powder in the positive active material are properly controlled, to effectively reduce side reactions between the positive active material and an electrolyte, decrease gas production of the electrochemical energy storage apparatus, and improve storage performance of the electrochemical energy storage apparatus without deteriorating energy density, cycle performance and rate performance of the electrochemical energy storage apparatus. The apparatus in this application includes the electrochemical energy storage apparatus, and therefore has at least the same advantages as the electrochemical energy storage apparatus.

Figure 1:
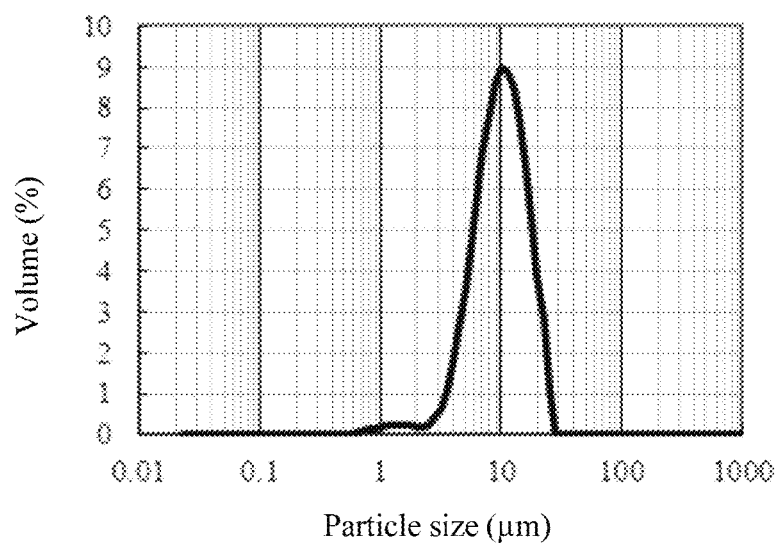
FIG. 1 is a differential volume-based particle size distribution curve of a positive active material in Comparative Example 1 of this application.

DESCRIPTION OF REFERENCE SIGNS 1. battery pack
2. upper box body
3. lower box body
4. battery module
5. electrochemical energy storage apparatus

DESCRIPTION OF EMBODIMENTS

The following describes in detail a positive active material and a preparation method thereof, a positive electrode plate, an electrochemical energy storage apparatus, and an apparatus in this application.

First described is the positive active material according to the first aspect of this application.

The positive active material according to the first aspect of this application is $Li_xNi_yCo_zM_kMe_pO_rA_m$ or $Li_xNi_yCo_zM_kMe_pO_rA_m$ whose surface is provided with a coating layer, where $0.85 \leq x \leq 1.15$, $0<y<1$, $0<z<1$, $0<k<1$, $0 \leq p \leq 0.1$, $1 \leq r \leq 2$, $0 \leq m \leq 1$, $m+r \leq 2$, M is one or two selected from Mn and Al, Me is one or more selected from Zr, Zn, Cu, Cr, Mg, Fe, V, Ti, Sr, Sb, Y, W, and Nb, and A is one or more selected from N, F, S, and Cl.

In an actual production process of a ternary material, due to problems of possible impurity and a low melting point of a raw material lithium salt used, melting, decomposition and volatilization loss may occur on the raw material lithium salt at a relatively low temperature. Therefore, in a process of preparing the ternary material, excessive lithium salt is added to compensate for lithium loss caused during a sintering process. A surface of the ternary material has active oxygen anions, which react with $CO_2$ and $H_2O$ in the air to form carbonate. Meanwhile, lithium ions migrate from an original location to the surface and form $Li_2CO_3$ on the surface of the ternary material. This process is accompanied by deoxidization of the surface of the ternary material to form a distorted-surface oxide layer. In addition, adding the excessive lithium salt during synthesis of the ternary material results in that main products of the excessive lithium salt calcined at high temperature are oxides of Li. The oxides of Li react with $CO_2$ and $H_2O$ in the air to form LiOH and $Li_2CO_3$, which remain on the surface of the ternary material, resulting in a relatively high pH value of the ternary material. In addition, during a charging and discharging process, $Li_2CO_3$ remaining on the surface of the ternary material decomposes to generate $CO_2$. Because the $CO_2$ gas causes a pressure difference due to a temperature difference (especially when a reaction process is accompanied by a thermal reaction), swelling of an electrochemical energy storage apparatus is aggravated, and storage performance of the electrochemical energy storage apparatus is deteriorated.

Providing a coating layer on a surface of $LiNi_yCo_zM_kMe_pO_rA_m$ can reduce residual lithium content (such as LiOH or $Li_2CO_3$) on the surface of the positive active material to a specific extent, and achieve the purpose of improving storage performance of the electrochemical energy storage apparatus. In addition, providing a coating layer on a surface of $Li_xNi_yCo_zM_kMe_pO_rA_m$ can also reduce a probability of side reactions caused due to direct contact between $LiNi_yCo_zM_kMe_pO_rA_m$ and an electrolyte, thereby further reducing the amount of oxygen released for balancing charges by the positive active material during the charging and discharging process, and reducing a crystal structure collapse risk arising therefrom. The $Li_2CO_3$ content on the surface of the positive active material obtained by providing a coating layer on the surface of $LiNi_yCo_zM_kMe_pO_rA_m$ is less than that of LiOH. In some embodiments, on the surface of the positive active material obtained by providing a coating layer on the surface of $LiNi_yCo_zM_kMe_pO_rA_m$, the $Li_2CO_3$ content is less than 3000 ppm, and the LiOH content is less than 5000 ppm.

The positive active material in the first aspect of this application is in morphology of secondary particles, and a particle size $D_n10$ of the positive active material satisfies: $0.5\ \mu m \leq D_n10 \leq 3\ \mu m$. In some embodiments, the particle size $D_n10$ of the positive active material satisfies: $1\ \mu m \leq D_n10 \leq 2\ \mu m$.

An energy density, storage performance, cycle performance and rate performance of the electrochemical energy storage apparatus are closely associated with physical and chemical properties of the positive active material. The ternary material is a positive active material that mainly includes transition metal elements Ni and Co adjacent to each other in a same period, and achieves a charge balance through changes in valence states of Ni and Co. Ni is one of main active metal elements, and mainly in the form of +2 valence. In a process of deintercalating lithium, $Ni^{2+}$ is oxidized to $Ni^{3+}$ and $Ni^{4+}$. Co is also one of the active metal elements, and mainly in the form of +3 valence. In a process of deintercalating lithium, $Co^{3+}$ is oxidized to $Co^{4+}$. Therefore, in a process of deintercalating lithium, the ternary material mainly achieves the charge balance through changes in valence states of Ni and Co. As proportions of Ni and Co change, the energy density, storage performance, cycle performance and rate performance of the electrochemical energy storage apparatus change to different degrees.

In the ternary material, higher Ni content usually indicates larger capacity per gram of the ternary material, and is more helpful in increasing the energy density of the electrochemical energy storage apparatus. However, when the Ni content in the ternary material is relatively high, a layered structure of the ternary material collapses due to mixing of $Ni^{2+}$ and $Li^+$, making it more difficult to deintercalate $Li^+$ in the ternary material, and ultimately leading to deterioration of the cycle performance of the electrochemical energy storage apparatus. An increase of the Ni content in the ternary material further reduces a thermal decomposition temperature of the ternary material, resulting in an increase in the amount of heat release and deterioration of thermal stability of the ternary material. When the Ni content in the ternary material increases, the amount of $Ni^{4+}$ with strong oxidizability also increases. When the electrolyte comes into contact with the ternary material, more side reactions between the electrolyte and the ternary material occur, and in order to maintain the charge balance, the ternary material releases oxygen. This not only destroys a crystal structure of the ternary material, but also aggravates the swelling of the electrochemical energy storage apparatus and deteriorates the storage performance of the electrochemical energy storage apparatus.

Compared with a positive active material of a large particle size, a specific surface area of a positive active material of a small particle size is larger, a contact area between the positive active material of the small particle size and the electrolyte is increased, and more side reactions may occur when the positive active material is in contact with the electrolyte. In order to maintain the charge balance, the positive active material of the small particle size may release more oxygen, which may not only destroy the crystal structure of the ternary material, but also aggravate the swelling of the electrochemical energy storage apparatus and deteriorate the storage performance of the electrochemical energy storage apparatus. Meanwhile, the positive active material with the small particle size is weak in compression resistance and is more likely to be crushed and produce more primary particles during the cold pressing of an electrode plate. A part of the primary particles may fall off from a positive current collector because the part of the primary particles is not in contact with a binder, and a part of the primary particles may locally deteriorate the performance of the positive electrode plate because this part is not in contact with a conductive agent.

In addition, generally, for a positive active material with a wide range of particle size distribution, a volume percentage of powder of a small particle size, especially micro powder, in the positive active material is insignificant. Therefore, a conventional volume particle size used to express the amount of micro powder content in the positive active material is relatively rough, and a number particle size used to express the amount of micro powder content in the positive active material is more accurate and intuitive, which is helpful in properly controlling the swelling of the electrochemical energy storage apparatus.

Therefore, in comprehensive consideration of impact of the foregoing factors on the energy density, storage performance, cycle performance and rate performance of the electrochemical energy storage apparatus, the positive active material as described in the first aspect of this application is a ternary material in morphology of secondary particles: $Li_xNi_yCo_zM_kMe_pO_rA_m$ or $Li_xNi_yCo_zM_kMe_pO_rA_m$ whose surface is provided with a coating layer, with the particle size $D_n10$ satisfying $0.5\ \mu m \le D_n10 \le 3\ \mu m$. Particle morphology of the positive active material and the amount of micro powder in the positive active material are properly controlled, to effectively reduce side reactions between the positive active material and the electrolyte, decrease gas production of the electrochemical energy storage apparatus, and improve storage performance of the electrochemical energy storage apparatus without deteriorating energy density, cycle performance and rate performance of the electrochemical energy storage apparatus.

In some embodiments, in $Li_xNi_yCo_zM_kMe_pO_rA_m$, $0.50 \le y \le 0.90$, $0.05 \le z \le 0.2$, $0.05 \le k \le 0.4$, and $0 \le p \le 0.05$.

In some further embodiments, in $Li_xNi_yCo_zM_kMe_pO_rA_m$, $0.70 \le y \le 0.90$, $0.05 \le z \le 0.2$, $0.05 \le k \le 0.2$, and $0 \le p \le 0.05$. For a ternary material with higher nickel content ($0.70 \le y \le 0.90$), a relative amount of micro powder of a small particle size has more significant impact on residual lithium content and gassing problem of the positive active material. Therefore, controlling $D_n10$ of the high-nickel secondary-particle-morphological ternary material $Li_xNi_yCo_zM_kMe_pO_rA_m$ or $Li_xNi_yCo_zM_kMe_pO_rA_m$ whose surface is provided with a coating layer to be within 0.5 μm to 3 μm is an effective means to solve the gassing problem.

Specifically, $Li_xNi_yCo_zM_kMe_pO_rA_m$ may be $LiNi_{1/3}Co_{1/3}Mn_{1/3}O_2$, $LiNi_{0.5}Co_{0.2}Mn_{0.3}O_2$, $LiNi_{0.5}Co_{0.25}Mn_{0.25}O_2$, $LiNi_{0.55}Co_{0.15}Mn_{0.3}O_2$, $LiNi_{0.55}Co_{0.1}Mn_{0.35}O_2$, $LiNi_{0.55}Co_{0.05}Mn_{0.4}O_2$, $LiNi_{0.6}Co_{0.2}Mn_{0.2}O_2$, $LiNi_{0.75}Co_{0.1}Mn_{0.15}O_2$, $LiNi_{0.5}Co_{0.1}Mn_{0.1}O_2$, $LiNi_{0.55}Co_{0.05}Mn_{0.1}O_2$, $LiNi_{0.55}Co_{0.05}Mn_{0.07}O_2$, or $LiNi_{0.9}Co_{0.05}Mn_{0.05}O_2$, or may be a substance obtained through modification by partially substituting the foregoing substance with the doping element Me and/or the doping element A.

In the positive active material according to the first aspect of this application, coating the surface of $LiNi_yCo_zM_kMe_pO_rA_m$ can avoid direct contact between $Li_xNi_yCo_zM_kMe_pO_rA_m$ and the electrolyte, and reduce side reactions between the positive active material and the electrolyte. In some embodiments, a coating element in the coating layer is selected from one or a combination of more of Al, Ba, Zn, Ti, Co, W, Y, Si, Sn, B, and P. In some further embodiments, a coating element in the coating layer is selected from a combination of two or more of Al, Ba, Zn, Ti, Co, W, Y, Si, Sn, B, and P.

In some embodiments, the coating layer includes an oxide of the foregoing coating element. In some further embodiments, the coating layer includes oxides formed by two or more of the foregoing coating elements. When the coating layer includes oxides formed by the at least two coating elements, stability of adhesion of the coating layer to the surface of $Li_xNi_yCo_zM_kMe_pO_rA_m$ can be improved, so that the coating layer has a specific degree of ion conductivity and electron conductivity, thereby mitigating impact of the coating layer on polarization of the positive active material.

In the positive active material in the first aspect of this application, the particle size $D_n10$ of the positive active material measured in μm and a particle size $D_v10$ of the positive active material measured in μm satisfy: $1 \le D_n10 \times D_v10 \le 20$. In some further embodiments, the particle size $D_n10$ of the positive active material measured in μm and the particle size $D_v10$ of the positive active material measured in μm satisfy: $2 \le D_n10 \times D_v10 \le 18$. $D_v10$ is a corresponding particle size when a cumulative volume distribution percentage of the positive active material reaches 10%, and $D_n10$ is a corresponding particle size when a cumulative number distribution percentage of the positive active material reaches 10%. When a product of $D_n10$ and $D_v10$ of the positive active material is within the foregoing range, it indicates that a relative amount of micro powder of an excessively small particle size in the positive active material is relatively small, and that the capacity of the positive active material is relatively high. This is helpful in alleviating the gassing problem of the positive active material while ensuring that a volumetric energy density of the electrochemical energy storage apparatus is relatively high.

In some embodiments, the particle size $D_v10$ of the positive active material is 2 μm to 8 μm. In some further embodiments, the particle size $D_v10$ of the positive active material is 3 μm to 6 μm.

In the positive active material according to the first aspect of this application, a theoretical specific surface area $BET_1$ of the positive active material and an actual specific surface area $BET_2$ of the positive active material satisfy: $0.8 \le (BET_2 - BET_1)/BET_1 \le 5.5$.

The theoretical specific surface area of the positive active material $BET_1 = 6/(\rho \times D_v50)$. $\rho$ is an actual density of the positive active material, measured in g/cm³. $D_v50$ is a corresponding particle size when the cumulative volume distribution percentage of the positive active material reaches 50%, measured in μm.

The actual specific surface area $BET_2$ of the positive active material can be measured by using the $N_2$ adsorption method. For details, refer to GB/T19587-2004.

In this application, $(BET_2-BET_1)/BET_1$ represents a degree of deviation between the theoretical specific surface area and the actual specific surface area of the positive active material, which can measure a degree of unevenness on the surface of the positive active material. Controlling the degree of deviation between the theoretical specific surface area and the actual specific surface area of the positive active material to be within a specific range can ensure that the surface of the positive active material having the secondary particle morphology is relatively flat, with fewer unevenness structures, and can indicate that primary particles forming the secondary particles have good uniformity in particle size. This is helpful in reducing the polarization of the positive active material, improving ion transport performance, further decreasing the gas production, and optimizing dynamic performance.

In some embodiments, the actual specific surface area $BET_2$ of the positive active material is 0.1 m²/g to 0.8 m²/g. When the actual specific surface area of the positive active material is within the foregoing range, a contact area between the electrolyte and the positive active material is relatively small, which is helpful in inhibiting side reactions, avoiding corrosion damage of the electrolyte to the crystal structure of the positive active material, and thereby avoiding aggravating the gassing problem of the electrochemical energy storage apparatus. In addition, when the actual specific surface area of the positive active material is within the foregoing range, it is further helpful in achieving relatively strong adhesion of the binder and the conductive agent to the positive active material with fewer auxiliary materials in making a positive slurry through mixing, thereby helping to increase the energy density of the electrochemical energy storage apparatus.

In some embodiments, the particle size $D_v50$ of the positive active material is 5 μm to 8 μm. In some further embodiments, the particle size $D_v50$ of the positive active material is 8 μm to 15 μm.

In some embodiments, a particle size $D_v90$ of the positive active material is 10 μm to 30 μm. In some further embodiments, the particle size $D_v90$ of the positive active material is 12 μm to 25 μm.

In the positive active material according to the first aspect of this application, a differential particle size distribution curve of the positive active material has one and only one peak. The differential particle size distribution curves include both a differential volume-based particle size distribution curve and a differential number-based particle size distribution curve.

Next described is a method for preparing the positive active material according to the second aspect of this application, which is used to prepare the positive active material in the first aspect of this application. The method includes the following steps: mixing a ternary material precursor (a compound containing Ni, Co, and M), a Li-containing compound, a compound containing the doping element Me, and a compound containing the doping element A in a mixing device, then sintering the resulting mixture in an atmosphere furnace, and after the sintering is completed, performing graded screening to obtain the positive active material.

There is no special restriction on a manner of graded screening, and it can be selected based on an actual condition. In some embodiments, the graded screening may be air flow graded screening or sieve-based screening.

A specific process of the air flow graded screening is as follows: The sintered material is put into an air flow classifier, and then ejected from a nozzle with an air flow of a specific pressure; particles are separated by size by using the principle that particles of different sizes have inconsistent weights, where a particle with smaller weight flies closer, while a particle with larger weight flies farther. A distance between a collector and the nozzle is adjusted to find particles with an appropriate particle size, thereby obtaining the positive active material.

A specific process of the sieve-based screening is as follows: The sintered material is sifted using a 200- to 1000-mesh sieve. Due to different particle sizes of the particles, particles with a small particle size will pass through the sieve, and those with a required particle size can be retained on the sieve, thereby obtaining the positive active material. In some embodiments, the number of meshes of the sieve is 500 to 800.

The ternary material precursor may include but is not limited to: $Ni_{1/3}Co_{1/3}Mn_{1/3}(OH)_2$, $Ni_{0.5}Co_{0.2}Mn_{0.3}(OH)_2$, $Ni_{0.5}Co_{0.25}Mn_{0.25}(OH)_2$, $Ni_{0.55}Co_{0.15}Mn_{0.3}(OH)_2$, $Ni_{0.55}Co_{0.1}Mn_{0.35}(OH)_2$, $Ni_{0.55}Co_{0.05}Mn_{0.4}(OH)_2$, $Ni_{0.6}Co_{0.2}Mn_{0.2}(OH)_2$, $Ni_{0.75}Co_{0.1}Mn_{0.15}(OH)_2$, $Ni_{0.8}Co_{0.1}Mn_{0.1}(OH)_2$, $Ni_{0.88}Co_{0.05}Mn_{0.07}(OH)_2$, $0.9Ni_{0.8}Co_{0.2}(OH)_2 \cdot 0.1Al_2(OH)_3$, and $0.9Ni_{0.9}Co_{0.05}Mn_{0.05}(OH)_2 \cdot 0.1Al_2(OH)_3$.

The Li-containing compound may include but is not limited to one or a combination of more of $LiOH \cdot H_2O$, $LiOH$, $Li_2CO_3$, and $Li_2O$.

The compound containing the doping element Me may be one or a combination of more of an oxide, nitrate, and carbonate containing at least one element of Zr, Zn, Cu, Cr, Mg, Fe, V, Ti, Sr, Sb, Y, W, and Nb.

The compound containing the doping element A may include but is not limited to one or a combination of more of LiF, NaCl, $Na_2S$, and $Li_3N$.

Conditions of the sintering may be 700° C. to 800° C., and oxygen concentration≥20%.

Next described is another method for preparing the positive active material according to the third aspect of this application, which is used to prepare the positive active material in the first aspect of this application. The method includes the following steps: S. Mix a ternary material precursor (a compound containing Ni, Co, and M), a Li-containing compound, a compound containing the doping element Me, and a compound containing the doping element A in a mixing device, and primarily sinter the resulting mixture in an atmosphere furnace. S2. Mix the primarily sintered material and a compound containing the coating element in the mixing device, and then secondarily sinter the resulting mixture in the atmosphere furnace. S3. Perform graded screening on the secondarily sintered material to obtain the positive active material.

The manner of graded screening is not specially limited, which can be selected based on an actual situation. In some embodiments, the graded screening may be air flow graded screening or sieve-based screening.

A specific process of the air flow graded screening is as follows: The secondarily sintered material is put into an air flow classifier, and then ejected from a nozzle with an air flow of a specific pressure; particles are separated by size by using the principle that particles of different sizes have inconsistent weights, where a particle with smaller weight flies closer, while a particle with larger weight flies farther. A distance between a collector and the nozzle is adjusted to find particles with an appropriate particle size, thereby obtaining the positive active material.

A specific process of the sieve-based screening is as follows: The secondarily sintered material is sifted using a 200- to 1000-mesh sieve. Due to different particle sizes of the particles, particles with a small particle size will pass through the sieve, and those with a required particle size can be retained on the sieve, thereby obtaining the positive active material. In some embodiments, the number of meshes of the sieve is 500 to 800.

The ternary material precursor may include but is not limited to: $Ni_{1/3}Co_{1/3}Mn_{1/3}(OH)_2$, $Ni_{0.5}Co_{0.2}Mn_{0.3}(OH)_2$, $Ni_{0.5}Co_{0.25}Mn_{0.25}(OH)_2$, $Ni_{0.55}Co_{0.15}Mn_{0.3}(OH)_2$, $Ni_{0.55}Co_{0.1}Mn_{0.35}(OH)_2$, $Ni_{0.55}Co_{0.05}Mn_{0.4}(OH)_2$, $Ni_{0.6}Co_{0.2}Mn_{0.2}(OH)_2$, $Ni_{0.75}Co_{0.1}Mn_{0.15}(OH)_2$, $Ni_{0.8}Co_{0.1}Mn_{0.1}(OH)_2$, $Ni_{0.88}Co_{0.05}Mn_{0.07}(OH)_2$, $0.9Ni_{0.8}Co_{0.2}(OH)_2 \cdot 0.1Al_2(OH)_3$, and $0.9Ni_{0.9}Co_{0.05}Mn_{0.05}(OH)_2 \cdot 0.1Al_2(OH)_3$.

The Li-containing compound may include but is not limited to one or a combination of more of $LiOH \cdot H_2O$, $LiOH$, $Li_2CO_3$, and $Li_2O$.

The compound containing the doping element Me may be one or a combination of more of an oxide, nitrate, and carbonate containing at least one element of Zr, Zn, Cu, Cr, Mg, Fe, V, Ti, Sr, Sb, Y, W, and Nb.

The compound containing the doping element A may include but is not limited to one or a combination of more of LiF, NaCl, $Na_2S$, and $Li_3N$.

The compound containing the coating element may be one or a combination of more of an oxide, nitrate, phosphate, and carbonate containing one or more elements of Al, Ba, Zn, Ti, Co, W, Y, Si, Sn, B, and P. The amount used of the compound containing the coating element may account for 0.01% to 0.5% of total mass of the positive active material.

Conditions of the primary sintering may be 700° C. to 800° C., and oxygen concentration≥20%.

A condition of the secondary sintering may be 200° C. to 700° C.

Next described is the positive electrode plate according to the fourth aspect of this application. The positive electrode plate includes a positive current collector and a positive membrane that is provided on at least one surface of the positive current collector and that includes the positive active material according to the first aspect of this application.

In the positive electrode plate according to the fourth aspect of this application, the positive membrane may be disposed on one surface of the positive current collector, or may be disposed on two surfaces of the positive current collector.

In the positive electrode plate according to the fourth aspect of this application, the positive membrane may further include a conductive agent and a binder, and types and amounts of the conductive agent and the binder are not specifically limited, and may be selected based on actual needs. The binder usually includes a fluorine-containing polyolefin binder. For the fluorine-containing polyolefin binder, water is usually a good solvent, that is, the fluorine-containing polyolefin binder usually has good solubility in water. For example, the fluorine-containing polyolefin binder may include but is not limited to polyvinylidene fluoride (PVDF), vinylidene fluoride copolymer or a modified (for example, modified with carboxylic acid, acrylic acid, or acrylonitrile) derivative thereof, or the like. The conductive agent may be various conductive agents suitable for an electrochemical energy storage apparatus in the art, for example, including but not limited to one or a combination of more of acetylene black, conductive carbon black, carbon fiber, carbon nanotube, and Ketjen black.

In the positive electrode plate according to the fourth aspect of this application, the positive current collector is not limited to any specific type, and may be selected based on actual needs. The positive current collector may typically be a layer, and the positive current collector is typically a structure or component that can collect current. The positive current collector may be various materials suitable to be used as the positive current collector of the electrochemical energy storage apparatus in the art. For example, the positive current collector may include but is not limited to a metal foil, and more specifically, may include but is not limited to a nickel foil or an aluminum foil.

Next described is the electrochemical energy storage apparatus according to the fifth aspect of this application. The electrochemical energy storage apparatus includes the positive active material in the first aspect of this application.

In the electrochemical energy storage apparatus in the fifth aspect of this application, it should be noted that the electrochemical energy storage apparatus may be a super capacitor, a lithium-ion battery, a lithium metal battery, or a sodium-ion battery. In the examples of this application, only an example in which the electrochemical energy storage apparatus is a lithium-ion battery is provided, but this application is not limited thereto.

The electrochemical energy storage apparatus in the fifth aspect of this application may include a positive electrode plate, a negative electrode plate, a separator sandwiched between the positive electrode plate and the negative electrode plate, and an electrolyte. The positive electrode plate is the positive electrode plate in the fourth aspect of this application, and the positive electrode plate includes the positive active material in the first aspect of this application.

A method for preparing the electrochemical energy storage apparatus should be known to those skilled in the art. For example, the positive electrode plate, the separator, and the negative electrode plate each may be a layer, which thus can be cut to a target size and then stacked in order, also can be wound to a target size to form an electrode assembly, and can be further combined with an electrolyte to form an electrochemical energy storage apparatus.

In the electrochemical energy storage apparatus, the negative electrode plate usually includes a negative current collector and a negative active material layer that is located on a surface of the negative current collector. The negative active material layer usually includes a negative active material. The negative active material may be various materials suitable for the negative active material of the electrochemical energy storage apparatus in the art, for example, including but not limited to one or a combination of more of graphite, soft carbon, hard carbon, carbon fiber, mesophase carbon microspheres, silicon-based material, tin-based material, lithium titanate, and another metal that can form an alloy with lithium. The graphite may be selected from one or a combination of more of artificial graphite, natural graphite, and modified graphite. The silicon-based material may be selected from one or a combination of elemental silicon, a silicon-oxygen compound, a silicon-carbon composite, and a silicon alloy. The tin-based material may be selected from one or a combination of elemental tin, a tin-oxygen compound, and a tin alloy. The negative current collector is usually a structure or component that collects a current. The negative current collector may be various materials suitable to be used as the negative current collector of the electrochemical energy storage apparatus in the art. For example, the negative current collector may include but is not limited to a metal foil, and more specifically, may include but is not limited to a copper foil.

In the electrochemical energy storage apparatus, the negative electrode plate may alternatively be a lithium plate.

In the electrochemical energy storage apparatus, the separator may be various materials suitable to be a separator of an electrochemical energy storage apparatus in the art, for example, including but not limited to one or a combination of more of polyethylene, polypropylene, polyvinylidene fluoride, aramid, polyethylene terephthalate, polytetrafluoroethylene, polyacrylonitrile, polyimide, polyamide, polyester, and natural fiber.

In the electrochemical energy storage apparatus, the electrolyte may be various electrolytes suitable for an electrochemical energy storage apparatus in the art. For example, the electrolyte usually includes an electrolyte and a solvent, and the electrolyte may usually include lithium salt. More specifically, the lithium salt may be inorganic lithium salt and/or organic lithium salt, and may specifically include but is not limited to one or a combination of $LiPF_6$, $LiBF_4$, $LiN(SO_2F)_2$ (LiFSI for short), $LiN(CF_3SO_2)_2$ (LiTFSI for short), $LiClO_4$, $LiAsF_6$, $LiB(C_2O_4)_2$ (LiBOB for short), and $LiBF_2C_2O_4$ (LiDFOB for short). For another example, concentration of the electrolyte may be 0.8 mol/L to 1.5 mol/L. The solvent may be various solvents suitable for an electrolyte of an electrochemical energy storage apparatus in the art. The solvent of the electrolyte is usually a non-aqueous solvent, preferably an organic solvent, and may specifically include but is not limited to one or a combination of more of ethylene carbonate, propylene carbonate, 2,3-butylene carbonate, prenyl carbonate, dimethyl carbonate, diethyl carbonate, dipropyl carbonate, ethyl methyl carbonate and a halogenated derivative thereof.

In some embodiments, the electrochemical energy storage apparatus may include an outer package for encapsulating the positive electrode plate, the negative electrode plate, and the electrolyte. In an example, the positive electrode plate, the negative electrode plate, and the separator may be stacked or wound to form an electrode assembly of a stacked structure or an electrode assembly of a wound structure, and the electrode assembly is encapsulated in the outer package. The electrolyte may use an electrolyte, and the electrolyte is infiltrated in the electrode assembly. There may be one or more electrode assemblies in the electrochemical energy storage apparatus, and the number of the electrode assemblies may be adjusted as required.

In some embodiments, the outer package of the electrochemical energy storage apparatus may be a soft package, for example, a soft bag. A material of the soft package may be plastic, for example, one or more of polypropylene (PP), polybutylene terephthalate (PBT), and polybutylene succinate (PBS). Alternatively, the outer package of the electrochemical energy storage apparatus may be a hard shell, for example, an aluminum shell.

Figure 5:
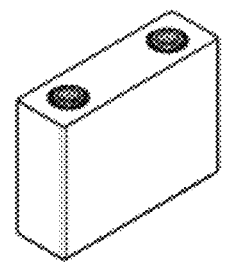
FIG. 5 is a perspective view of an embodiment of an electrochemical energy storage apparatus.

This application has no particular limitation on a shape of the electrochemical energy storage apparatus, and the electrochemical energy storage apparatus may be of a cylindrical, a square, or any other shape. FIG. 5 shows an electrochemical energy storage apparatus 5 of a square structure as an example.

In some embodiments, the electrochemical energy storage apparatus may be assembled into a battery module, and the battery module may include a plurality of electrochemical energy storage apparatuses. A specific number may be adjusted based on application and capacity of the battery module.

Figure 6:
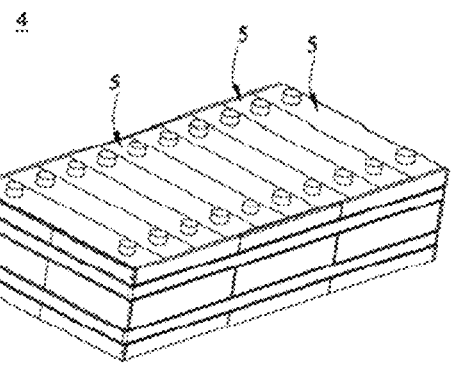
FIG. 6 is a perspective view of an embodiment of a battery module.

FIG. 6 shows a battery module 4 as an example. Referring to FIG. 6, in the battery module 4, a plurality of electrochemical energy storage apparatuses 5 may be arranged in order along a length direction of the battery module 4, or may be arranged in any other manner. Further, the plurality of electrochemical energy storage apparatuses 5 may be fastened by using a fastener.

Optionally, the battery module 4 may further include a housing that has an accommodating space, and the plurality of electrochemical energy storage apparatuses 5 are accommodated in the accommodating space.

In some embodiments, the foregoing battery module may be further assembled into a battery pack, and the number of battery modules included in the battery pack may be adjusted based on use and capacity of the battery pack.

Figure 7:
FIG. 7 is a perspective view of an embodiment of a battery pack.
Figure 8:
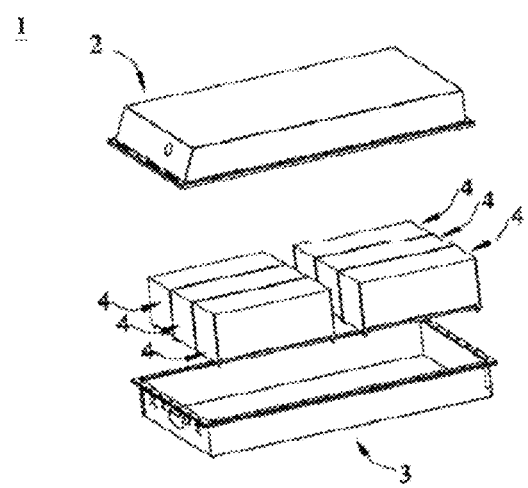
FIG. 8 is an exploded view of FIG. 7.

FIG. 7 and FIG. 8 show a battery pack 1 as an example. Referring to FIG. 7 and FIG. 8, the battery pack 1 may include a battery box and a plurality of battery modules 4 disposed in the battery box. The battery box includes an upper box body 2 and a lower box body 3. The upper box body 2 can cover the lower box body 3 and form an enclosed space for accommodating the battery modules 4. The plurality of battery modules 4 may be arranged in the battery box in any manner.

Finally described is the apparatus according to the sixth aspect of this application, the apparatus includes the electrochemical energy storage apparatus according to the fifth aspect of this application, and the electrochemical energy storage apparatus may serve as a power supply of the apparatus or serve as an energy storage unit of the apparatus. The apparatus includes but is not limited to an electric vehicle (for example, a pure-electric vehicle, a hybrid electric vehicle, a plug-in hybrid electric vehicle, an electric bicycle, an electric scooter, an electric golf vehicle, or an electric truck), an electric train, a ship, a satellite, and the like. In addition, the electric train, the ship, and the satellite all are carrying tools and belong to vehicles in a broad sense.

An electrochemical energy storage apparatus, a battery module, or a battery pack may be selected for the apparatus according to use requirements for the apparatus.

Figure 9:
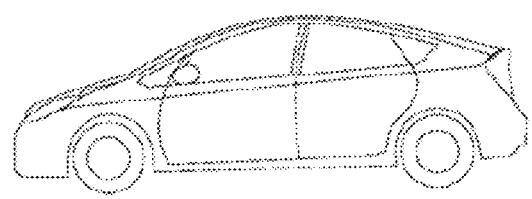
FIG. 9 is a schematic diagram of an embodiment of an apparatus using an electrochemical energy storage apparatus as a power supply.

FIG. 9 shows an apparatus as an example. The apparatus is a pure-electric vehicle, a hybrid electric vehicle, a plug-in hybrid electric vehicle, or the like. To meet high power and high energy density requirements of the apparatus for an electrochemical energy storage apparatus, a battery pack or a battery module may be used.

The following further describes this application with reference to embodiment examples. It should be understood that these embodiment examples are merely intended to describe this application rather than to limit the scope of this application.

Lithium-ion batteries in Examples 1 to 8 and Comparative Examples 1 and 2 were all prepared according to the following method.

(1) Preparation of a Positive Active Material

Ternary material precursors $Ni_{0.8}Co_{0.1}Mn_{0.1}(OH)_2$, $LiOH \cdot H_2O$, and $ZrO_2$ at a molar ratio of 0.997:1.05:0.003 were mixed in a mixer, and then sintered in an oxygen-filled atmosphere furnace. After the sintering was completed, graded screening was performed to find an appropriate particle size, so as to obtain a positive active material $Li(Ni_{0.8}Co_{0.1}Mn_{0.1})_{0.997}Zr_{0.003}O_2$.

(2) Preparation of a Positive Electrode Plate

The positive active material, a binder polyvinylidene fluoride, and a conductive agent acetylene black were mixed at a mass ratio of 98:1:1, then N-methylpyrrolidone was added, and then the mixture was stirred evenly by using a vacuum mixer, to obtain a positive slurry. The positive slurry was uniformly applied onto a 12-μm-thick aluminum foil of a positive current collector, and the aluminum foil was dried at room temperature and transferred to an oven for further drying at 100° C. to 130° C., followed by cold pressing and cutting, to obtain a positive electrode plate.

(3) Preparation of a Negative Electrode Plate

A negative active material graphite, a thickener sodium carboxymethyl cellulose, a binder styrene butadiene rubber, and a conductive agent acetylene black were mixed at a mass ratio of 97:1:1:1, deionized water was added, and the mixture was stirred by using a vacuum mixer to obtain a negative slurry. The negative slurry was uniformly applied onto an 8-μm-thick copper foil, and the copper foil was dried at room temperature and transferred to an oven for further drying at 100° C. to 130° C., followed by cold pressing and cutting, obtain a negative electrode plate.

(4) Preparation of an Electrolyte

An organic solvent was a mixture of ethylene carbonate (EC), ethyl methyl carbonate (EMC) and diethyl carbonate (DEC), where a volume ratio of EC, EMC, and DEC was 20:20:60. In an argon atmosphere glove box with water content less than 10 ppm, fully dried lithium salt $LiPF_6$ was dissolved in the organic solvent and mixed evenly to obtain an electrolyte, where concentration of the lithium salt was 1 mol/L.

(5) Preparation of a Separator

A 12-μm-thick polypropylene membrane was used as a separator.

(6) Preparation of a Lithium-Ion Battery

The positive electrode plate, the separator, and the negative electrode plate were stacked in order, so that the separator was sandwiched between the positive and negative electrode plates for isolation. After they were wound into a square-shaped electrode assembly, the electrode assembly was wrapped with an aluminum plastic film and baked at 80° C. to remove water. Then, the electrolyte was injected, followed by sealing. Steps such as standing, hot and cold pressing, chemical conversion, fixturing, and capacity sorting were then performed to obtain a lithium-ion battery.

The lithium-ion battery in Example 9 was prepared according to the following method.

(1) Preparation of a Positive Active Material

Ternary material precursors $Ni_{0.8}Co_{0.1}Mn_{0.1}(OH)_2$, $LiOH \cdot H_2O$, and $ZrO_2$ at a molar ratio of 0.997:1.05:0.003 were mixed in a mixer, and then primarily sintered in an oxygen-filled atmosphere furnace. The primarily sintered material and 0.5 wt % $Al_2O_3$ were mixed in the mixing device, and then secondarily sintered in the atmosphere furnace. Then, graded screening was performed on the secondarily sintered material to find an appropriate particle size, so as to obtain a positive active material $Li(Ni_{0.8}Co_{0.1}Mn_{0.1})_{0.997}Zr_{0.003}O_2$ whose surface was provided with $Al_2O_3$.

(2) Preparation of a Positive Electrode Plate

The positive active material, a binder polyvinylidene fluoride, and a conductive agent acetylene black were mixed at a mass ratio of 98:1:1, then N-methylpyrrolidone was added, and then the mixture was stirred evenly by using a vacuum mixer, to obtain a positive slurry. The positive slurry was uniformly applied onto a 12-μm-thick aluminum foil of a positive current collector, and the aluminum foil was dried at room temperature and transferred to an oven for further drying at 100° C. to 130° C., followed by cold pressing and cutting, to obtain a positive electrode plate.

(3) Preparation of a Negative Electrode Plate

A negative active material graphite, a thickener sodium carboxymethyl cellulose, a binder styrene butadiene rubber, and a conductive agent acetylene black were mixed at a mass ratio of 97:1:1:1, deionized water was added, and the mixture was stirred by using a vacuum mixer to obtain a negative slurry. The negative slurry was uniformly applied onto an 8-μm-thick copper foil, and the copper foil was dried at room temperature and transferred to an oven for further drying at 100° C. to 130° C., followed by cold pressing and cutting, to obtain a negative electrode plate.

(4) Preparation of an Electrolyte

An organic solvent was a mixture of ethylene carbonate (EC), ethyl methyl carbonate (EMC) and diethyl carbonate (DEC), where a volume ratio of EC, EMC, and DEC was 20:20:60. In an argon atmosphere glove box with water content less than 10 ppm, fully dried lithium salt $LiPF_6$ was dissolved in the organic solvent and mixed evenly to obtain an electrolyte, where concentration of the lithium salt was 1 mol/L.

(5) Preparation of a Separator

A 12-μm-thick polypropylene membrane was used as a separator.

(6) Preparation of a Lithium-Ion Battery

The positive electrode plate, the separator, and the negative electrode plate were stacked in order, so that the separator was sandwiched between the positive and negative electrode plates for isolation. After they were wound into a square-shaped electrode assembly, the electrode assembly was wrapped with an aluminum plastic film and baked at 80° C. to remove water. Then, the electrolyte was injected, followed by sealing. Steps such as standing, hot and cold pressing, chemical conversion, fixturing, and capacity sorting were then performed to obtain a lithium-ion battery.

A lithium-ion battery of Example 10 was prepared by using a method similar to the method for preparing the lithium-ion battery in Example 9, and a difference lied in that $Al_2O_3$ of 0.5 wt % was replaced with $B_2O_3$ of 0.5 wt % in Example 10.

Next, a test procedure for the lithium-ion batteries is described.

(1) Determination of Residual Lithium Content on a Surface of the Positive Active Material 30 g powder of the prepared positive active material was taken and added to 100 mL water and stirred for 30 min. Residual lithium in the sample under test was titrated with a standard hydrochloric acid solution. A composite pH electrode was used as an indicator electrode, and a titration endpoint was determined through a sudden jump produced by a potential change.

(2) Cycle Performance Test for the Lithium-Ion Battery at High Temperature

At 45° C., the lithium-ion battery was charged to a voltage of 4.2V with a constant current of 1 C, then the lithium-ion battery was charged to 0.05 C current with a constant voltage of 4.2V, and the lithium-ion battery was discharged to a final voltage of 2.8V at a constant current of 1 C. Discharge capacity of the first cycle was recorded. Then more cycles of charging and discharging were performed according to the foregoing operations until the capacity was reduced to 80% of initial capacity. The number of cycles at this point was the high-temperature cycle life.

(3) Storage Performance Test for the Lithium-Ion Battery at High Temperature

At 25° C., first the lithium-ion battery was charged with a constant current of 1 C to 4.2V, and then charged with a constant voltage of 4.2V to 0.05 C current. Then, the volume of the lithium-ion battery was measured by using a drainage method, recorded as an initial volume of the lithium-ion battery. Then the lithium-ion battery is stored at 80° C. for 10 days. After that, the volume of the lithium-ion battery was measured again by using the drainage method, recorded as a volume of the lithium-ion battery after 10 days storage at 80° C.

Volume swelling rate (%) of the lithium-ion battery after 10 days storage at 80° C.=[Volume of the lithium-ion battery after 10 days storage at 80° C./Initial volume of the lithium-ion battery−1]× 100%.

(4) Capacity Test for the Positive Active Material of the Lithium-Ion Battery

The lithium-ion battery was kept still in a constant temperature environment of 25° C. for 2 hours, then charged to 4.2V at ⅓C under 2.8V to 4.2V, then charged with a constant voltage of 4.2V to a current less than or equal to 0.05 mA, kept still for 5 min, and then discharged to 2.8V at 1 C. Capacity of the lithium-ion battery at this point was recorded, and the measured capacity was divided by the mass of the positive active material in the battery to obtain capacity of the positive active material in the lithium-ion battery.

TABLE 1

Parameters of the positive active materials in Examples 1 to 10 and Comparative Examples 1 and 2

| | $D_n10$ (μm) | $D_v10$ (μm) | $D_v50$ (μm) | $BET_2$ (m²/g) | $(BET_2-BET_1)/BET_1$ | Coating substance |
|---|---|---|---|---|---|---|
| Example 1 | 0.5 | 5.0 | 9 | 0.8 | 4.6 | / |
| Example 2 | 1.5 | 7.5 | 14 | 0.5 | 4.5 | / |
| Example 3 | 1.8 | 5.1 | 16 | 0.18 | 1.3 | / |
| Example 4 | 1.5 | 3.4 | 8 | 0.34 | 1.1 | / |
| Example 5 | 2.5 | 5.6 | 12 | 0.5 | 3.7 | / |
| Example 6 | 3.0 | 6.0 | 18 | 0.35 | 3.9 | / |
| Example 7 | 1.5 | 7.5 | 16 | 0.49 | 5.1 | / |
| Example 8 | 0.5 | 2.0 | 5 | 0.48 | 0.9 | / |
| Example 9 | 1.1 | 3.7 | 11 | 0.55 | 3.7 | $Al_2O_3$ |
| Example 10 | 2.4 | 4.8 | 13 | 0.45 | 3.6 | $B_2O_3$ |
| Comparative Example 1 | 0.2 | 2.5 | 10 | 0.6 | 3.7 | / |
| Comparative Example 2 | 4 | 4.4 | 10 | 0.5 | 2.9 | / |

TABLE 2

Performance test results of Examples 1 to 10 and Comparative Examples 1 and 2

| | $Li_2CO_3$ content (ppm) | LiOH content (ppm) | Capacity of positive active material (mAh/g) | Number of cycles at 45° C. | Volume swelling rate after 10 days storage at 80° C. |
|---|---|---|---|---|---|
| Example 1 | 2354 | 3451 | 196 | 1232 | 99% |
| Example 2 | 2234 | 3612 | 195 | 1182 | 94% |
| Example 3 | 2131 | 3588 | 194 | 1124 | 93% |
| Example 4 | 2554 | 3821 | 196 | 1198 | 95% |
| Example 5 | 2764 | 3353 | 196 | 1218 | 89% |
| Example 6 | 2481 | 3221 | 194 | 1198 | 87% |
| Example 7 | 2341 | 4312 | 194 | 854 | 105% |
| Example 8 | 2651 | 4231 | 196 | 989 | 115% |
| Example 9 | 2412 | 1831 | 195 | 1287 | 78% |
| Example 10 | 1531 | 1952 | 196 | 1098 | 86% |
| Comparative Example 1 | 3452 | 4525 | 194 | 894 | 154% |
| Comparative Example 2 | 2324 | 3821 | 192 | 951 | 125% |

It can be learned from analysis of the test results in Table 2 that in the positive active materials for the lithium-ion batteries of Examples 1 to 10, there was a small relative amount of micro powder with a particle size less than 1 μm in the positive active material, and the positive active material had higher capacity. In addition, the lithium-ion battery had a longer high-temperature cycle life and a lower high-temperature storage volume swelling rate. Therefore, properly controlling particle morphology of the positive active material and the amount of micro powder in the positive active material could effectively reduce side reactions between the positive active material and the electrolyte, decrease gas production of the lithium-ion battery, and improve storage performance of the lithium-ion battery without deteriorating energy density, cycle performance and rate performance of the lithium-ion battery.

It could also be found, through further analysis of test results of Examples 1 to 8, that controlling a degree of deviation between a theoretical specific surface area $BET_1$ and an actual specific surface area $BET_2$ of the positive active material could further optimize a micro structure of the positive active material, to ensure a relative flat surface of the positive active material formed with fewer uneven structures. This was helpful in reducing the polarization of the positive active material and improving the transport of ions, thereby further decreasing the gas production of the lithium-ion battery and optimizing kinetic performance of the lithium-ion battery.

Compared with Example 1, the positive active material in Examples 9 and 10 was $Li(Ni_{0.8}Co_{0.1}Mn_{0.1})_{0.997}Zr_{0.003}O_2$ with coating on its surface. Coating the surface of $Li(Ni_{0.8}Co_{0.1}Mn_{0.1})_{0.997}Zr_{0.003}O_2$ could avoid direct contact between $Li(Ni_{0.8}Co_{0.1}Mn_{0.1})_{0.997}Zr_{0.003}O_2$ and the electrolyte, and reduce the probability of side reactions between the positive active material and the electrolyte. In addition, a coating layer of $Al_2O_3$ and $B_2O_3$ had good ion conductivity and electron conductivity, which could alleviate the gassing problem while minimizing impact of the coating layer on the polarization of the positive active material.

Figure 2:
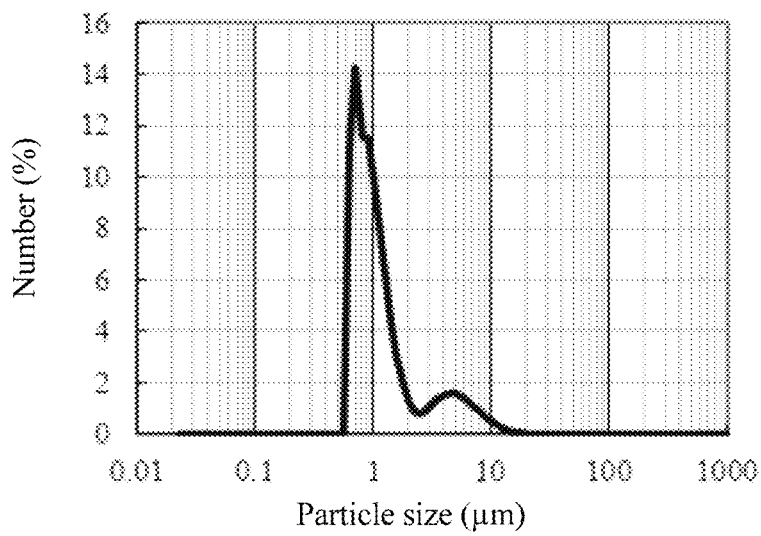
FIG. 2 is a differential number-based particle size distribution curve of a positive active material in Comparative Example 1 of this application.
Figure 3:
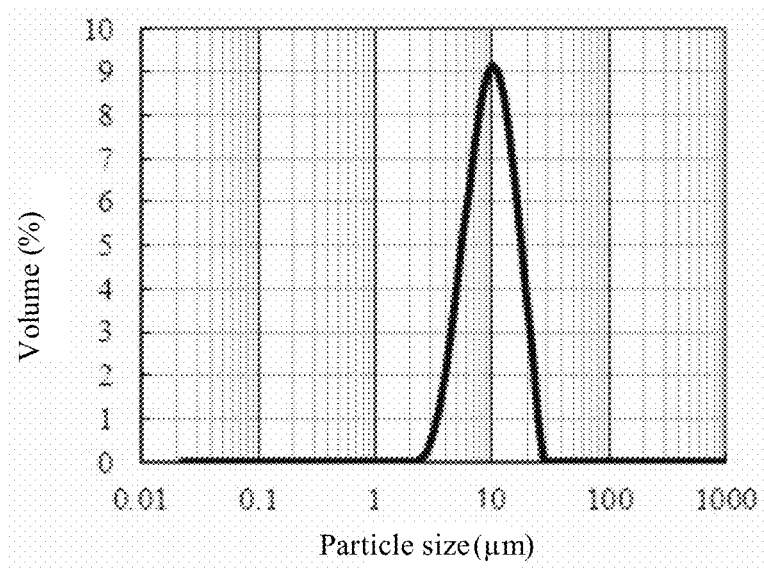
FIG. 3 is a differential volume-based particle size distribution curve of a positive active material in Example 3 of this application.
Figure 4:
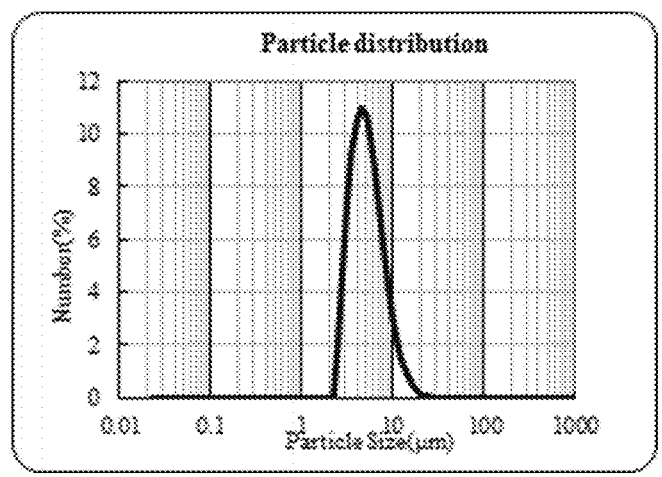
FIG. 4 is a differential number-based particle size distribution curve of a positive active material in Example 3 of this application.

In Comparative Example 1, $D_n10$ of the positive active material was further reduced. It can be found, from the differential volume-based particle size distribution curve and the differential number-based particle size distribution curve in FIG. 1 and FIG. 2, that the particle size distribution curves of the positive active material both had two peaks. A possible reason was an excessive relative amount of micro powder in the positive active material. With reference to FIG. 3 and FIG. 4, it can be learned that the differential volume-based particle size distribution curve and the differential number-based particle size distribution curve of the positive active material in this application were both unimodal, indicating a small relative amount of micro powder in the positive active material. When the relative amount of micro powder in the positive active material was too large, because a specific surface area of the micro powder was larger, the amount of residual lithium on the surface was larger, and a contact area with the electrolyte was larger. As such, more side reactions would take place when the positive active material came into contact with the electrolyte. In order to maintain the charge balance, the micro-power positive active material released more oxygen, which not only destroyed the crystal structure of the positive active material, but also aggravated the swelling of the lithium-ion battery and deteriorated the storage performance of the lithium-ion battery.

In Comparative Example 2, $D_n10$ of the positive active material was 4 μm. In this case, there was less micro powder content in the positive active material was, but due to the fact that $D_v50$ needed to be kept within a specific range to maintain good transport of ions, the particle size distribution of the positive active material was narrow, and many pores were present between particles of the positive active material in the positive electrode plate, and it was difficult to achieve high compaction density. In addition, during the cold pressing of the positive electrode plate, particles of the positive active material are more likely to be crushed, which might not only affect the energy density of the lithium ion battery but also aggravate the swelling of the lithium ion battery.

What is claimed is:

1. A positive active material, wherein
the positive active material is $Li_xNi_yCo_zM_kMe_pO_rA_m$ or $Li_xNi_yCo_zM_kMe_pO_rA_m$ whose surface is provided with a coating layer, wherein $0.85 \leq x \leq 1.15$, $0<y<1$, $0<z<1$, $0<k<1$, $0 \leq p \leq 0.1$, $1 \leq r \leq 2$, $0 \leq m \leq 1$, $m+r \leq 2$, M is one or two selected from Mn and Al, Me is one or more selected from Zr, Zn, Cu, Cr, Mg, Fe, V, Ti, Sr, Sb, Y, W, and Nb, and A is one or more selected from N, F, S, and Cl; and
the positive active material is secondary particles, a particle size $D_n10$ of the positive active material satisfies: $0.5\ \mu m \leq D_n10 \leq 3\ \mu m$, a particle size $D_v10$ of the positive active material is 2.5 μm to 8 μm, and $D_n10$ and $D_v10$ satisfy $1 \leq D_n10 \times D_v10 \leq 20$, wherein
$D_n10$ is a corresponding particle size when a cumulative number distribution percentage of the positive active material reaches 10%, and
$D_v10$ is a corresponding particle size when a cumulative volume distribution percentage of the positive active material reaches 10%.

2. The positive active material according to claim 1, wherein the particle size $D_n10$ of the positive active material satisfies $1\ \mu m \leq D_n10 < 2\ \mu m$.

3. The positive active material according to claim 1, wherein the coating layer comprises one or more coating elements selected from Al, Ba, Zn, Ti, Co, W, Y, Si, Sn, B, and P.

4. The positive active material according to claim 1, wherein the particle size $D_v10$ of the positive active material is 3 μm to 6 μm.

5. The positive active material according to claim 1, wherein
a theoretical specific surface area $BET_1$ of the positive active material and an actual specific surface area $BET_2$ of the positive active material satisfy: $0.8 \leq (BET_2 - BET_1)/BET_1 \leq 5.5$, wherein $BET_1 = 6/(\rho \times D_v50)$;

ρ is an actual density of the positive active material, measured in g/cm$^3$;
$D_v50$ is a corresponding particle size when the cumulative volume distribution percentage of the positive active material reaches 50%, measured in μm.

6. The positive active material according to claim 5, wherein the actual specific surface area $BET_2$ of the positive active material is 0.1 m$^2$/g to 0.8 m$^2$/g.

7. The positive active material according to claim 5, wherein the particle size $D_v50$ of the positive active material is 5 μm to 18 μm.

8. The positive active material according to claim 5, wherein the particle size $D_v50$ of the positive active material is 8 μm to 15 μm.

9. The positive active material according to claim 1, wherein a differential particle size distribution curve of the positive active material has one and only one peak.

10. A positive electrode plate, comprising the positive active material according to claim 1.

11. An electrochemical energy storage apparatus, comprising the positive active material according to claim 1.

12. An apparatus, wherein the apparatus is a vehicle and comprises the electrochemical energy storage apparatus according to claim 11.

13. The positive active material according to claim 1, wherein
the particle size $D_n10$ of the positive active material measured in μm and a particle size $D_v10$ of the positive active material measured in μm satisfy: $2 \leq D_n10 \, D_v10 \leq 18$.

14. The positive active material according to claim 1, wherein a particle size $D_v90$ of the positive active material is 10 μm to 30 μm, and $D_v90$ is a corresponding particle size when the cumulative volume distribution percentage of the positive active material reaches 90%, measured in μm.

15. The positive active material according to claim 14, wherein the particle size $D_v90$ of the positive active material is 12 μm to 25 μm.

16. The positive active material according to claim 1, wherein in the $Li_xNi_yCo_zM_kMe_pO_rA_m$, $0.50 \leq y \leq 0.90$, $0.05 \leq z \leq 0.2$, $0.05 \leq k \leq 0.4$, and $0 \leq p \leq 0.05$.

17. The positive active material according to claim 16, wherein in the $Li_xNi_yCo_zM_kMe_pO_rA_m$, $0.70 \leq y \leq 0.90$, $0.05 \leq z \leq 0.2$, $0.05 \leq k \leq 0.2$, and $0 \leq p \leq 0.05$.

* * * * *